(No Model.) 3 Sheets—Sheet 1.
E. H. AMET.
ELECTRIC WEIGHING AND RECORDING DEVICE.
No. 317,432. Patented May 5, 1885.
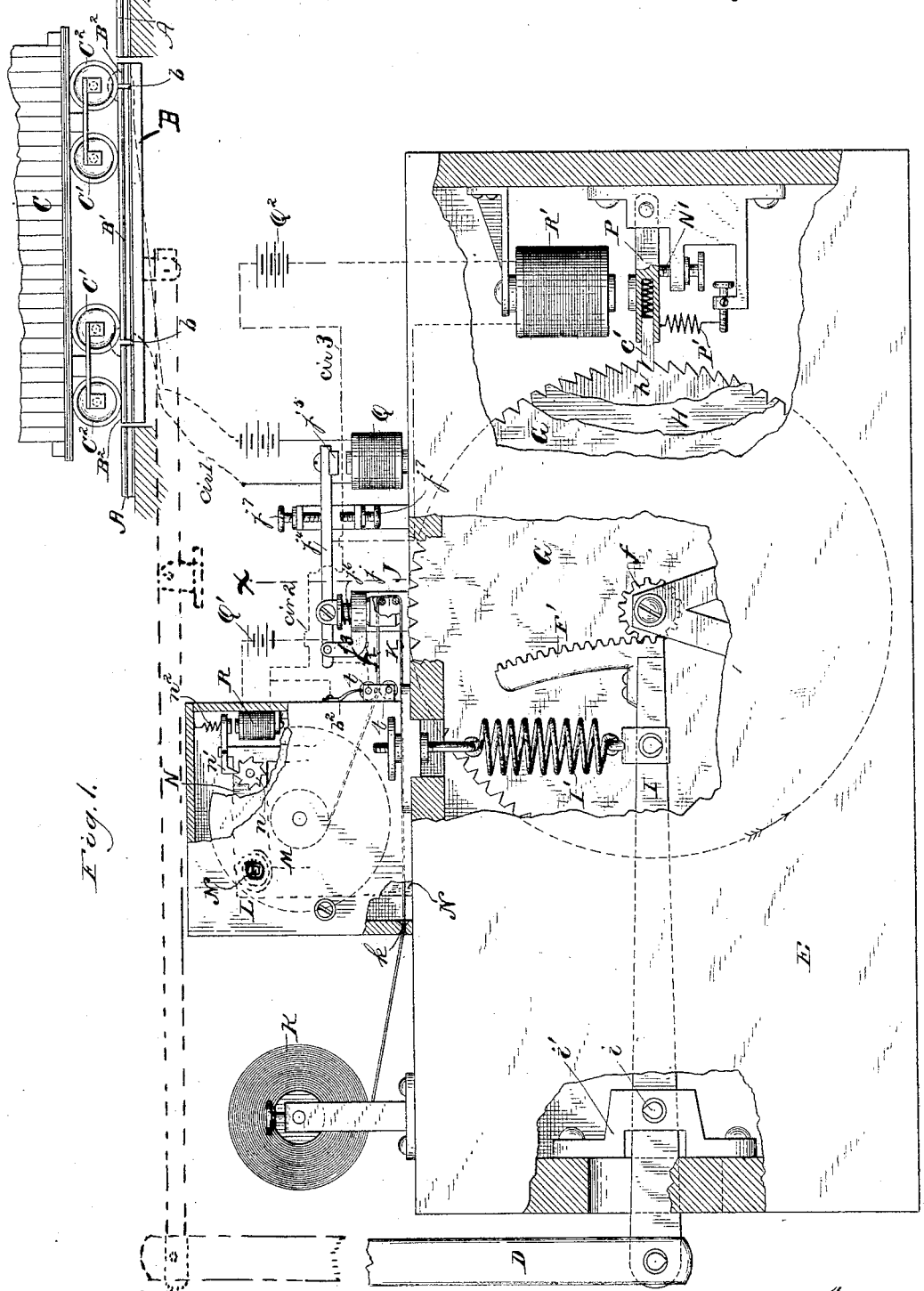
Witnesses.
Inventor.
Edward H. Amet
per. Baker & Dowlin
his Attorneys.

(No Model.) 3 Sheets—Sheet 2.
E. H. AMET.
ELECTRIC WEIGHING AND RECORDING DEVICE.
No. 317,432. Patented May 5, 1885.
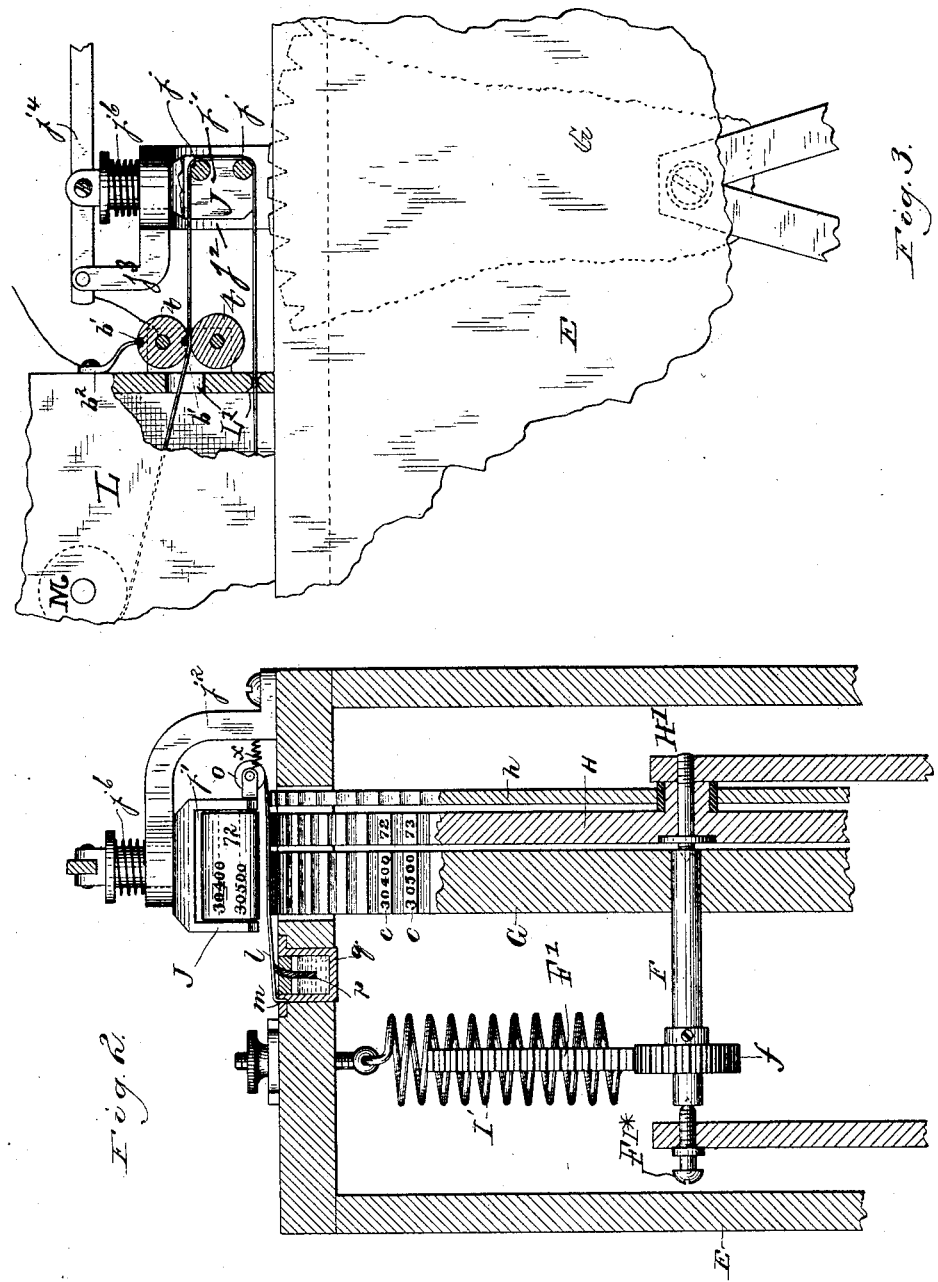

(No Model.) 3 Sheets—Sheet 3.

E. H. AMET.
ELECTRIC WEIGHING AND RECORDING DEVICE.

No. 317,432. Patented May 5, 1885.

Witnesses.
Henry Frankfurter
W. L. Baker.

Inventor.
Edward H. Amet.
per. Baker & Dowlin
his Attorneys.

UNITED STATES PATENT OFFICE.

EDWARD H. AMET, OF CHICAGO, ILLINOIS, ASSIGNOR TO HERBERT A. STREETER, OF SAME PLACE.

ELECTRIC WEIGHING AND RECORDING DEVICE.

SPECIFICATION forming part of Letters Patent No. 317,432, dated May 5, 1885.

Application filed May 10, 1884. (No model.)

*To all whom it may concern:*

Be it known that I, EDWARD H. AMET, of Chicago, Illinois, have invented certain new and useful Improvements in Electric Weighing and Recording Devices, of which the following is a full, clear, and concise description, sufficient to enable others skilled in the art to which it appertains to make and use the same.

The object of my invention is to automatically weigh, and, through the instrumentality of electrical devices, to automatically make records of the weight and number of objects weighed, and to automatically deposit said records in the regular order of their production.

My invention is here shown in combination with an ordinary car-scale, but may be applied to any and all forms of weighing apparatus, and I wish to be understood as not limiting my invention to the use herein shown.

As here shown, the invention consists, broadly, of electrical devices connected with a platform upon which are mounted the rails on which a car, loaded or unloaded, may be moved, and adapted to automatically register, record, and indicate the weight of each car and its contents as it passes over said platform.

The invention also consists in certain other modifications and features of construction hereinafter described and illustrated, and specifically set forth in the claims.

Figure 4:
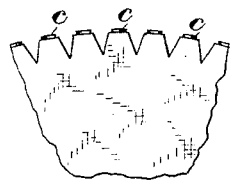
Figure 6:
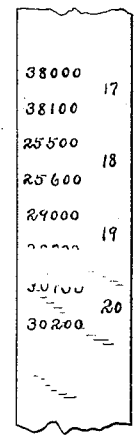
Figure 5:
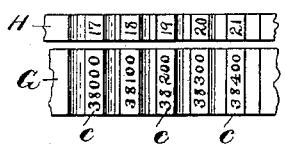
Figure 7:
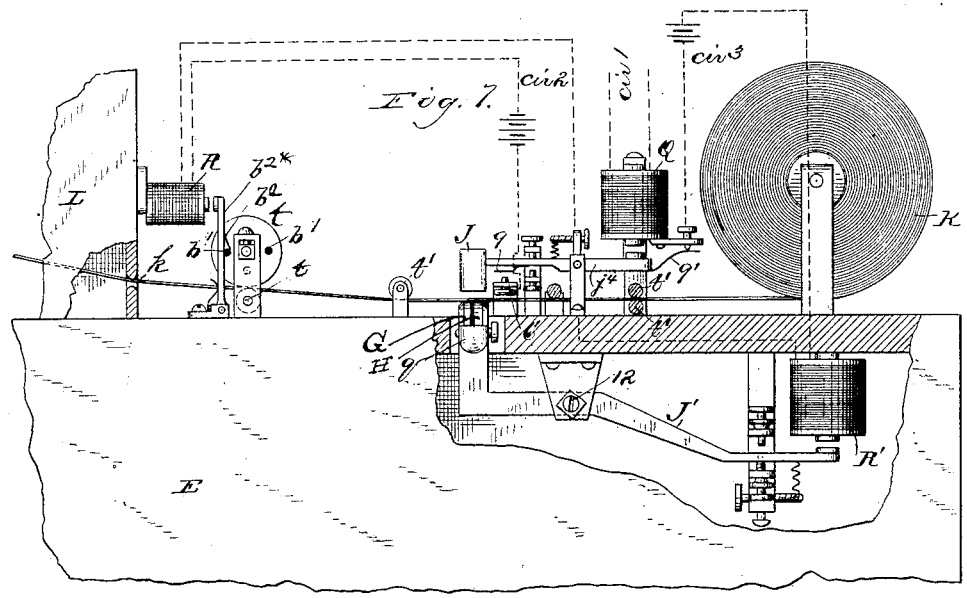

Referring to the drawings, Figure 1 is a side elevation of a portion of a track and of electrical weighing and recording devices, (shown partly in section,) adapted to co operate in producing the result set forth as the design of the invention. Fig. 2 is a transverse section on line $x$, Fig. 1, of a portion of the weighing and recording devices. Fig. 3 is an enlarged detail of the recording device. Figs. 4 and 5 are enlarged fragments in side elevation and plan, respectively, of the weighing and numbering disks employed. Fig. 6 is a portion of the record strip made thereby, and Fig. 7 is a modified arrangement of the principal elements employed.

The same letters refer to the same or like parts in all the figures.

A represents a portion of the main track, B a platform arranged therein, and having rails, B', in line with the rails A, but formed in sections long and short, the longer sections being arranged between the shorter sections, and the latter arranged at the ends of the platform, so that the longer sections B' will support the inner wheels, C', of a truck of the car C, while the shorter section $B^2$ will support the outer wheels, $C^2$, of such car-trucks. By this construction any electrical conductor in a circuit, as 1, may be connected to the short sections at opposite poles, and in the absence of a car on the platform the circuit thereof will be incomplete, by reason of the space $b$ between the sections B' and $B^2$, and said circuit will be complete when the car is on the rails, the current being carried through the trucks and the connecting frame-work thereof, and through the section B' and the opposite truck; or the circuit may comprise the long section B' and a short section, $B^2$, the wheel $C^2$ closing or completing the same. In this manner cars in the act of passing over the platform make and break the circuit 1, and at the same time, by means of a simple lever of any description connected in any suitable manner—for example, as shown by dotted lines, Fig. 1—with the platform and with the connecting-rod D, the weighing apparatus, hereinafter described, is also operated, and therefore cars rapidly succeeding each other in passing over the platform may be weighed, and, as hereinafter described, the weight of each car and its contents and the number of cars weighed will be duly recorded.

In a suitable case or frame-work, E, is supported a shaft, F, on which is a pinion, $f$, and a type disk or wheel, G, on the periphery of which are types $c$, or other printing devices, arranged consecutively and adapted to give impressions of numbers varying successively by one hundred. Adjacent to the said type-disk G is another type disk or wheel, H, mounted on the rigid pivot-bearing H' of the shaft F, so as to be mounted concentrically with and for independent rotation from the said shaft F, mounted on screw-points $F'^*$ and H', on the periphery of which disk are arranged type or impression devices adapted to give numbers successively, varying by one, and adjacent to the index-disk H, and rigidly attached thereto, is the ratchet-disk $h$, having on its periphery as many teeth as disk H has numbers.

Meshing with the pinion $f$ is a rack, F', mounted upon the longer arm of the lever I, having a knife-edge, $i$, bearing against a bracket, $i'$, secured to the frame-work or case E, while the shorter arm is connected by means of knife-edges to the connecting-rod D. A spring, $l'$, is secured to the case or frame-work and to the longer arm of the lever I, and has a constant tendency to raise said longer arm.

Directly over the top of and extending across both the weight-disk G and the numbering-disk H is a reciprocating stamp or printing-head, J, which comprises a pair of tape-rolls, $j$, one arranged at or near the lower surface of the head and the other above it and in line with a slot, $j'$, passing through the head, so that an endless tape or web of paper may be conducted under the printing-head up along one side thereof and backwardly through the slot thereof, as clearly shown in Figs. 1, 2, and 3.

At any suitable point on the frame-work or casing E is supported a reel of paper, K, which passes through a slot or slots, $k$, in the wall of any suitable case, as L, and from slots, L', in said case beneath and through the printing-head, as before described, and from it between feed-rolls $t\,t$ to any other suitable winding-reel or collecting mechanism, as M, arranged within the case L, said reel being operated by a spring-motor, N, (see Fig. 1,) having an escapement or ratchet wheel, $n$, and a pawl, $n'$, co-operating therewith to determine an intermittent action of the winding mechanism.

As thus far described it will be seen that in passing over the platform B each car, by its weight, acts upon the lever D and raises the same, so that the longer arm of the pivoted lever I is depressed against the tension of the spring $l'$, and that the rack or sector F' will operate the pinion $f$ and rotate to a greater or less extent the weight printing-disk G, in accordance with the weight of the car on the platform, and that by means of the pawl $c'$, mounted in the pivoted arm or armature P, normally held downward by a spring, P', the numbering-disk H and the ratchet-disk $h$ are rotated independently of the weight-disk G by raising the pawl against the tension of the spring P' and allowing the spring, after said pawl has been raised a single notch in the ratchet, to be drawn downwardly once during the movement of each successive car over the platform.

So far as the functions of the lever I, sector F' and disks G H are concerned, I consider them mechanical weighing and indicating devices, in that the lever is, in effect a scale-beam and the sector and disks a rotary poise taking the place and performing the functions of a sliding poise on the lever or beam I, while the peripheral numbers on the disks are the perfect equivalents of the usual indicating-marks on a scale-beam.

The mechanical devices and their functions having been described, it now remains to describe the electrical devices employed to operate, or to permit the operation of, the mechanical devices.

The printing-head J is supported by a bracket, $j^2$, which has a side standard, $j^3$, (see Fig. 3,) to which is pivotally secured a lever, $j^4$, carrying the armature $j^5$. A coil-spring, $j^6$, normally sustains the printing-head and holds the armature away from the electro-magnet Q, arranged in circuit 1, the adjusting-screws $j^7$ being arranged in an independent bracket, as usual. The lower one of said screws is connected in a circuit, 2, and a circuit, 3, the batteries Q' and Q² of which are connected in opposition—namely, copper to copper—their zinc elements being connected to the lever $j^4$. The circuit 2 attracts the pawl or detent $n'$ against the tendency of the spring $n^2$, by means of the electro-magnet R, while the circuit 3, by means of the electro-magnet R', attracts the pivoted level P, carrying the pawl $c'$, against the spring P'. The independent circuit 2, connected with the measuring feed-rolls $t\,t$, is connected so as to close the circuit independently of the lever $j^4$ and screw-point $j^7$, thus admitting the passage of a definite length of tape.

These being the electrical devices employed to operate the mechanical devices before described, the operation is as follows: As the front wheels of the car pass upon the platform the lever I and the rack F' are operated and the weight-disk G begins to revolve in the direction indicated by the arrow. As soon as the wheels have passed fully onto the platform and upon the short and long sections B' and B² the circuit is completed through the trucks of the car, and the armature $j^5$ attracts the lever $j^4$ against the tension of spring $j^6$, and the printing-head being depressed the records of the weights and the number of cars thus weighed appear upon the tape. The printing or inking tape $l$, Fig. 2, is firmly attached at a point, $m$, beyond the ink-well $q$, from which it absorbs ink through wick $p$, and is loosely attached to spring $x$. When the printing-head J describes a downward movement, the tape-roller $o$ presses the tape firmly down upon the faces of the numbering-type on the peripheries of disks H and G, and the letters standing in relief imprint upon the paper tape passing over the type. In order to guard against imperfect impressions or blotting by the stamping-head, it is made sufficiently large to enable two records of adjacent type on the disks to be made at each depression, as for instance, 38,000 and 38,100, as shown in Fig. 6. Now, by taking the average or mean between the two the actual weight of the complete car and its contents is indicated within fifty pounds.

During the operation the magnet R has attracted the pawl or detent $n'$, raising it from the rachet $n$ and allowing the spring-motor mechanism to wind the record strip upon the reel M. When circuit 2 is momentarially closed by action of magnet, Q, the magnet R and lever $n'$ are attracted and the spring motor is released, but the contact being so short an insufficient time would be given to allow the passage of the paper tape. In order to make an exact amount of paper pass, the following operation is had: At the moment the spring motor $b^2$ begins to revolve it causes the insulated point $b'$ on the upper measure-roll, $t$, to be carried past the spring $b^2$, thus allowing the spring to rest on the metal portion of the roll, thus forming an independent circuit, and allowing the roll to revolve until the opposite, the insulated, point is reached, when the circuit is opened and the pawl released.

The spring 2 is the terminal of independent circuit 2, and when its free end is in contact with the insulated points of roll $t$ said circuit is closed, and when in contact with the remaining portion of said roll said circuit is open, so that the roll rotates. Now, there being two diametrically-opposite insulated points, said roll will make intermittent semi-rotations, and feed a length of recording strip equal to the semi-circumference of said roll. Hence said rolls are designated as "measuring-feed rolls."

In Fig. 7 is shown a modified arrangement of the principal elements. The magnet Q being connected by means of circuit 1 with the track, when the circuit is closed in the manner heretofore described, the armature Q and lever $j^4$ are attracted, and the printing-stamp J is depressed and the impressions made, as heretofore described. At the moment when lever J is depressed contacts take place through springs 9 9 and circuits 2 and 3 are completed, the magnet R' and split lever J', which is made to encompass the disks and ratchet, and supported by bracket 12 and lever J, is drawn downward upon the inking-tape, which stretches across the faces of the disks, and the impressions are made upon the paper. The paper contained on roll K passes through rollers, $t'$ $t'$, drawn by the spring mechanism, and thence through measuring-rolls $t$ $t$, and thence into the box L. At the moment when lever $j^4$ is depressed a contact takes place between screw 6' and spring 9, and circuit 2 is closed, magnet R attracts lever $b^{2*}$, releases spring $b^2$, and the upper wheel, $t$, revolves until opposite detent or pin $b'$ is reached.

Having thus described my invention and its operation, what I claim as new, and desire to secure by Letters Patent, is—

1. The combination, with a platform and mechanical weighing devices connected therewith, of a numbering-disk electrically operated as successive bodies move across said platform, substantially as specified.

2. The combination, with a platform, mechanical weighing devices connected therewith, and with a weight-printing disk, of a printing-head electrically operated by means of the platform and by an object moving across the same, of a record-strip adapted to receive impressions from the weight-disk, substantially as specified.

3. The combination, with a platform and mechanical weighing devices connected therewith, and with a weight-indicating disk, of a number-indicating disk, a printing-head, and a record-strip-winding apparatus, each of which is electrically operated by an object moving over said platform, substantially as specified.

4. The combination of an electrical generator with a railroad-track of a platform having rails in section of such relative lengths and disposition that a conductor of an electrical current is formed by said sections and the wheels and trucks of electrical devices adapted to operate weighing devices, substantially as specified.

5. The combination of an electrical generator, a platform having sectional rails, a series of levers connected to mechanical weighing devices with an electrical device arranged in a circuit of which the rails of said platform form a part, and with printing devices connected with and operated by said electrical devices, substantially as specified.

6. The combination of an electrical generator, a platform comprising rails of the character described, and weight and numbering disks, means for rotating the same in accordance with the weight on said platform, and a printing-head electrically operated by a magnet in a circuit of which the rails on said platform form a part, substantially as described.

7. The combination of an electrical generator, a platform comprising rails of the character described, a magnet in circuit therewith, as specified, the armature of which is mounted on a lever forming a portion of a separate circuit connected with a separate magnet, the armature of which is mounted on a detent or escapement, a spring-motor, and a printing-head operated by the first magnet, and supplied with a record-tape after each impression made by the printing-head, substantially as specified.

8. The combination of an electrical generator with a platform comprising rails of the character described, a magnet in a circuit formed partly by the rails on said platform, oppositely-connected batteries connected to one of the adjusting-screws of said magnet, one of which oppositely-connected batteries is in circuit with a tape-feed-controlling mechanism, and the other of which oppositely-connected batteries is in circuit with mechanism for operating a numbering-wheel substantially as specified.

9. In combination, the electrical generator, the record-tape, a reel for winding said record-tape, a spring-motor for operating said reel, a detent and escapement in connection with said motor and with a magnet for attracting said detent, rolls rotated by the record-strip, and provided with insulated points, a short circuit from said points into the circuit of the detent-operating magnet, and means, substantially as shown and described, for making and breaking the circuit in which said magnet is located, whereby the amount of tape wound by the spring-motor is regulated independently of the duration of the contact of the detent with the magnet, substantially as specified.

10. In a weight printing and recording mechanism, the combination of a disk having weight-indicating characters on its periphery, a printing-head arranged opposite thereto, a magnet for depressing said printing-head to take an impression or impressions, a recording-tape, and means for guiding the same between the printing-head and the disk, a spring-motor for feeding the tape, and a magnet for releasing the motor intermittingly, as specified.

11. In a weighing and printing indicating apparatus, the combination, with the weight and number indicating devices, of a ratchet, a pivoted pawl operating therewith, and a magnet adapted to operate the pawl against the tendency of a pawl-operating spring, substantially as specified.

12. In a weight and number printing apparatus, the combination of weight and number disks and a printing-head of a ratchet, a spring supported printing-head, a spring-operated pawl, and a spring-motor operated reel, with magnets arranged and connected substantially as specified to operate the pawl, the printing-head, and the motor-detent, substantially as specified.

13. The combination, with the platform, comprising rails B, constructed as described, the circuit 1, the magnet Q, armature $j^5$, lever $j^4$, the printing-head J, and weight-disk, G, provided with printing-surfaces, substantially as specified.

14. In combination with the track A, the platform B, the rails of which are formed of the sections B' B², and the magnet Q, connected to the platform by the circuit 1 of an armature connected with printing mechanism, substantially as shown and described.

15. The combination of the platform B, magnet Q, and circuit 1 with the weight-disk G, shaft F, pinion $f$, rack F', lever I, spring I', connecting-rod D, suitably connected with the platform, as described, and a printing-head, J, substantially as and for the purpose set forth.

16. The combination of the lever I, sector or rack F', pinion $f$, weight-disk G, disk H, ratchet $h$, pawl $c'$, armature-lever P, spring P', magnets R' Q, and circuit 1, substantially as shown and specified.

17. The case L, provided with reel M, the spring-motor having the ratchet $n$, the detent $n'$, magnet R, circuit 2, rolls $t\ t$, having insulated points $i'$, and connection $l^2$, lever $j^4$, and magnet Q, substantially as shown and specified.

18. In a weighing, printing, and recording mechanism, the combination of a scale-beam and levers with spring I', the sector F', pinion $f$, weight-disk G, numbering-disk H, having weight and number indicating characters on their peripheries, ratchet $f$, printing-head J, arranged opposite thereto, and a magnet for depressing said printing-head, a recording-tape and means for guiding the same between the printing-head and the disks, a spring-motor for feeding the tape, and a magnet for releasing the motor intermittently, as specified.

19. The combination of an electrical generator, a scale-beam, a series of levers, and mechanical weighing devices, with electrical devices in circuit, and printing devices, and tape-winding and guiding devices connected with and operated by said electrical devices, and weight and number disks and means for rotating the same, substantially as and for the purpose specified.

EDWARD H. AMET.

Witnesses:
JOHN S. WERLLACON,
FREDERICK S. BAKER.